March 5, 1963 R. G. CRAIG ETAL 3,080,153
QUENCH TOWER
Filed March 27, 1959 3 Sheets-Sheet 2

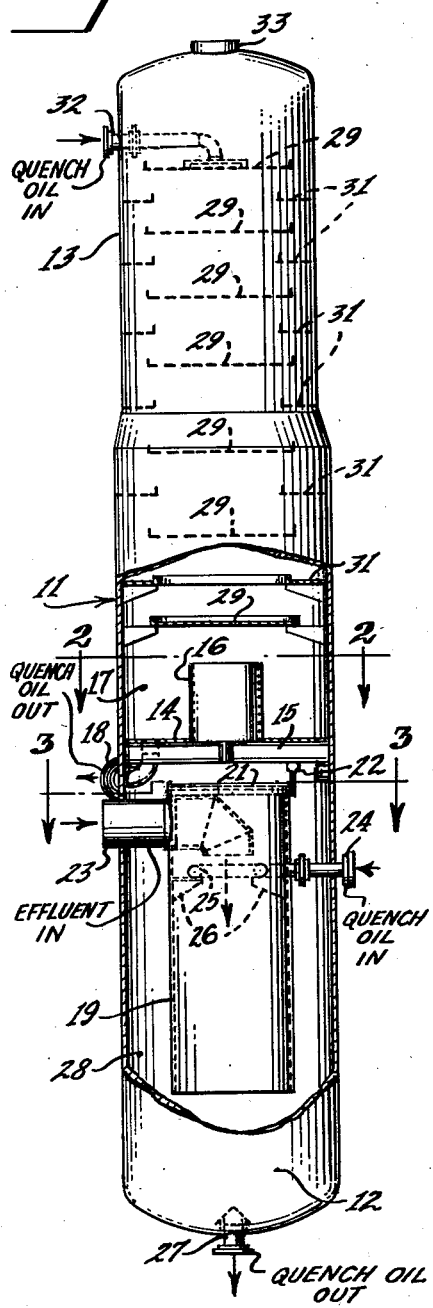
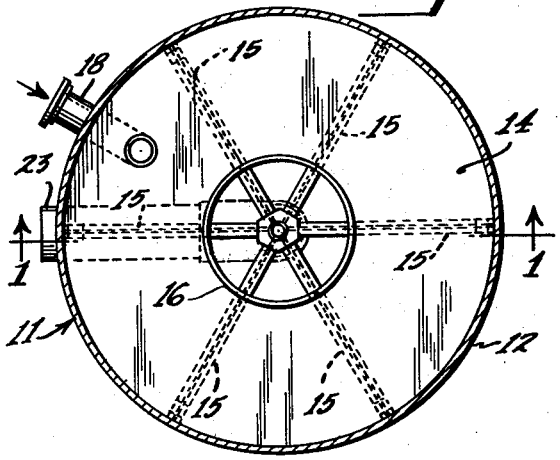
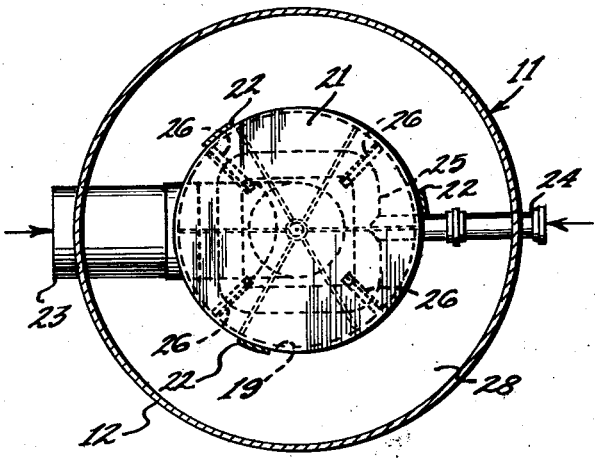

INVENTORS.
Robert G. Craig &
William J. Cresson, Jr.
BY
ATTORNEY.

March 5, 1963 R. G. CRAIG ETAL 3,080,153
QUENCH TOWER
Filed March 27, 1959 3 Sheets-Sheet 3
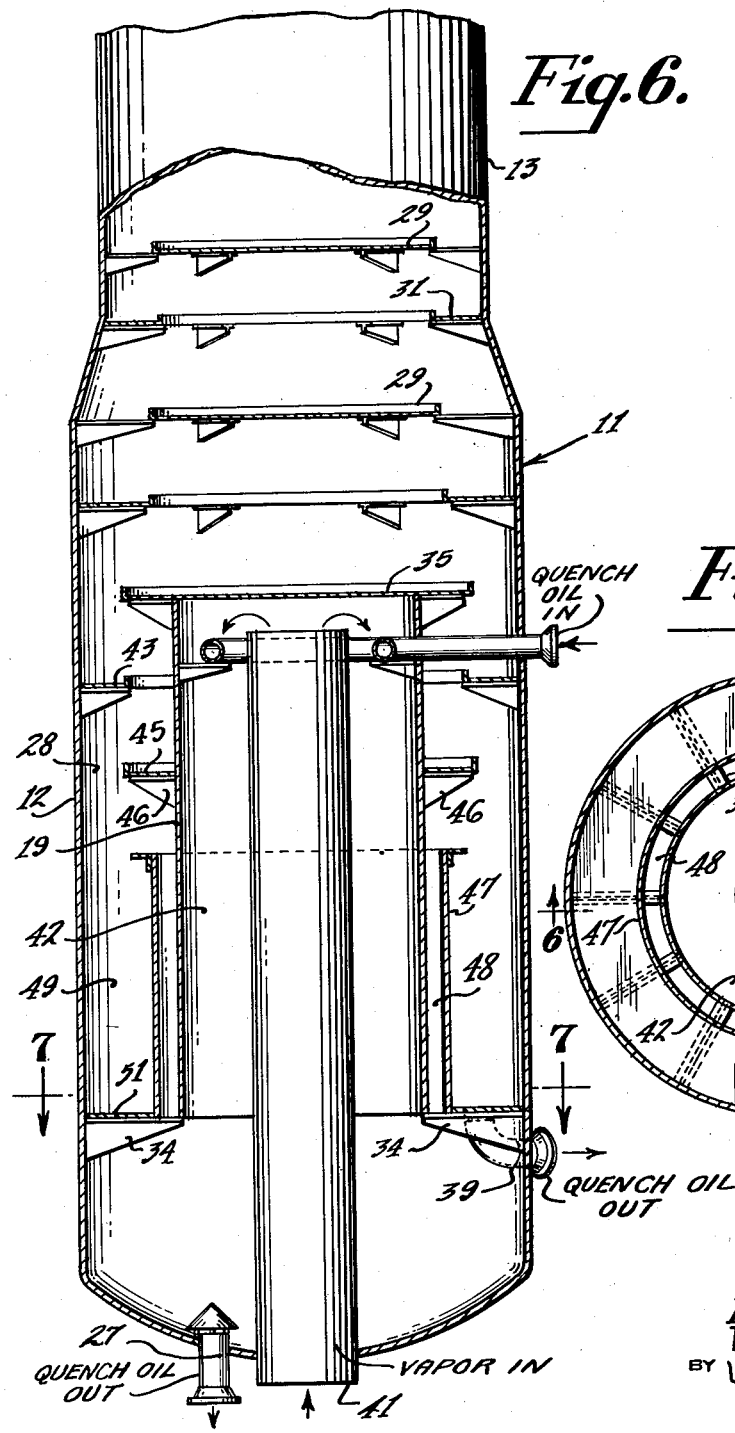
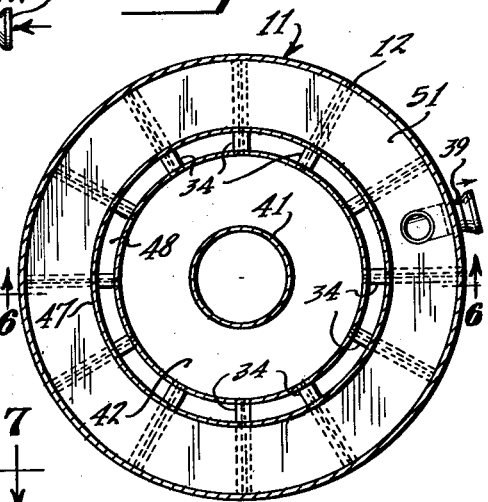
INVENTORS.
Robert G. Craig &
William J. Cresson, Jr.
BY William Klehunde
ATTORNEY United States Patent Office 3,080,153
Patented Mar. 5, 1963

3,080,153
QUENCH TOWER
Robert G. Craig, Wilmington, Del., and William J. Cresson, Jr., Swarthmore, Pa., assignors to Air Products and Chemicals, Inc., a corporation of Delaware
Filed Mar. 27, 1959, Ser. No. 802,352
1 Claim. (Cl. 261—22)

This invention relates to hydrocarbon conversion systems, and particularly to apparatus for quenching the hot effluent from a reactor so as to arrest the reactions occurring at the higher temperature and prevent undesirable reactions which could adversely affect the operation of downstream equipment. As applied, for example, to a dehydrogenation system, the quenching of the reactor effluent avoids certain product losses which would occur if elevated temperatures were maintained for a prolonged period, and diminishes the danger of excessive coking of the downstream equipment.

It is a present practice in hydrocarbon conversion systems to employ separate pre-quench and quench towers for rapidly cooling the reactor effluent in successive stages. In a typical dehydrogenation system, the gaseous reactor effluent is first passed into a pre-quench tower comprising an elongated vertical cylindrical vessel wherein the gaseous material, introduced at the upper end thereof, is immediately contacted by a spray of quench oil and is caused to flow therewith concurrently downward through the vessel to effect a rapid pre-cooling of the reactor product stream. At the bottom of the pre-quench tower, the cooled gaseous material is separated from the quench oil and is conveyed for final cooling to a separate main quench tower of substantially larger size, also comprising an elongated vertical cylindrical vessel.

Within the main quench tower the light gaseous material is disengaged from the liquid product and is caused to flow upwardly through a system of staggered horizontal trays while being contacted with quench oil cascading downwardly through the tray section. Within the quench tower the temperature of the product gases is further lowered to the desired level for handling in the downstream equipment.

As commonly arranged, the pre-quench and quench towers are situated side-by-side, with a short communicating conduit between the towers. Because of the high temperatures involved, serious problems arise with respect to expansion and contraction of the communicating conduit as a result of temperature changes, with the result that relatively expensive provision must be made to accommodate such expansion and contruction. Furthermore, by reason of the large size of both vessels, the costs of fabrication, erection, support, piping and fittings and controls incidental thereto are relatively high. There is, therefore, a constant desire and need for reducing the number and size of vessels, insofar as it is practicable, and a need for more efficient arrangement thereof whereby the initial cost of construction and the cost for maintenance and repair may be held to a minimum.

In accordance with the present invention, a simple and more efficient arrangement of apparatus and a more economical design of the large vessels required for quenching are obtained by combining the heretofore separate pre-quench and quench towers, one within the other, to form a unitary structure which will be relatively free of the aforementioned serious problems incident to the separate tower arrangement presently in use. Thus, in accordance with the invention, the usual main quench tower is provided with a smaller cylindrical vessel or tower within its lower region, the inner vessel being open at the bottom and closed at the top, that is, in the form of a bell. The inner vessel or bell is positioned a short distance above the bottom of the larger vessel and provides an internal pre-quench tower. Inlet conduits are provided to introduce the reactor effluent and pre-quench oil into the internal pre-quench tower, both being introduced within the upper region thereof. The gaseous reactor effluent stream immediately contacts the quench oil, introduced as a spray, and passes concurrently downward therewith through the pre-quench tower and into the bottom of the main quench tower, where the gaseous material is readily separated from the oil. The heated pre-quench oil is withdrawn from the bottom of the main tower, while the cooled gaseous material reverses its direction of flow and passes upwardly through the annular space or passageway between the vertical sides of the inner and outer vessels. The partially quenched gaseous material enters the upper region of the main quench tower and passes upwardly to an overhead outlet while being countercurrently contacted by a second stream of quench oil which descends through the upper region of the quench tower as a stream cascading over the conventional arrangement of circular and annular trays.

The pre-quench vessel or tower is supported by one of its ends within the larger tower, thereby leaving the other end free to accommodate any slight differential expansion or contraction.

In a preferred embodiment of the invention, the pre-quenched, but still hot, gaseous material which has reversed its direction of flow at the bottom of the main quench tower and is passing upwardly through the annular space between the walls of the inner and outer vessels is channeled into one or more passageways or conduits which convey the gaseous material into the main quenching section of the larger vessel. In known manner the pre-quenched gaseous material traverses the main quench section in a generally upward direction by being passed radially back and forth or from side to side through successive falling curtains of quench liquid which descend from one tray to the next until the quench liquid reaches a collecting well at the bottom of the main quench section of the larger tower.

For a fuller understanding of the invention, reference may be had to the following specification and claim taken in connection with the accompanying drawings forming a part of this invention, in which:

FIG. 1 is a sectional elevation of a quench tower combining within the single unitary structure both pre-quench and main quench sections;

FIG. 2 is a horizontal section taken along line 2—2 of FIG. 1;

FIG. 3 is a horizontal section taken along line 3—3 of FIG. 1;

FIG. 6 is a partial section, as in FIG. 4, but shown another modification of the pre-quench section; and FIG. 7 is a horizontal section taken along line 7—7 of FIG. 6.

Figure 4:
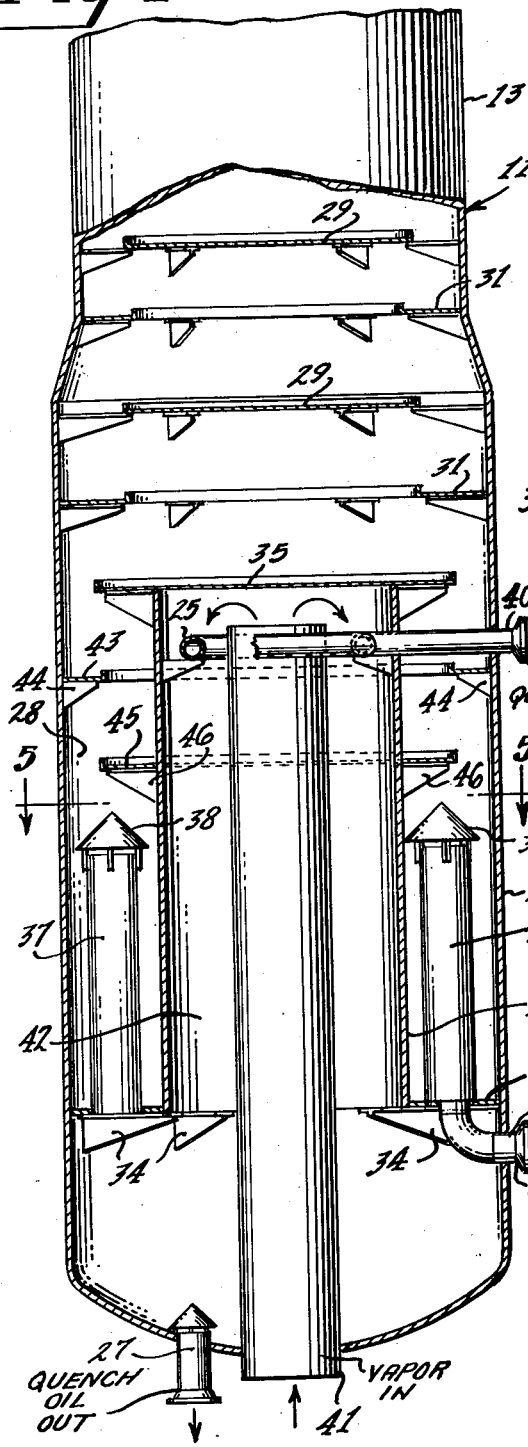
FIG. 4 is a sectional elevation of the lower portion of the main quench tower shown in FIG. 1, showing a modification of the pre-quench section.

In FIG. 1 of the drawings, the main quench tower 11 comprises an upright elongated vessel in the form of a stepped cylinder having a lower section 12 and an upper section 13 of reduced diameter. The lower tower section 12 is horizontally partitioned at an intermediate level by an annular plate member 14 supported upon a suitable number of horizontal radial beams 15, six of which are illustrated in the drawings.

The central opening of the annular plate 14 is provided with an upright open tubular member 16 which provides open gaseous communication between the separate upper and lower portions of cylindrical tower section 12. The annular space 17 formed between the walls of cylindrical tower section 12 and tubular member 16, and closed at its lower end by annular plate 14, forms a well to catch the quench oil passing downwardly through the main quench section of the tower 11. The main quench oil is drained from the well 17 to the exterior of the tower 11 through outlet nozzle 18.

A smaller cylindrical vessel 19, closed at its upper end by horizontal cover 21, is suspended concentrically within the lower portion of tower section 12, a plurality of hangers 22 being attached to the upper end of vessel 19 and to the underside of horizontal beams 15 for this purpose. The vessel 19, which is in the general form of a bell, provides a pre-quench chamber for the hot reactor effluent admitted to the tower 11. The reactor effluent is introduced through the side of lower tower section 12 below partition 14, and then through the side of the inner vessel 19, by inlet conduit 23. The conduit 23 has its inner end arranged to discharge the incoming gaseous effluent axially downward within the pre-quench chamber of vessel 19.

Pre-quench oil, which may be oil drained from the main quench section through outlet 18, is introduced through the side walls of lower tower section 12 and vessel 19 by conduit 24, the inner end of the conduit terminating in a ring spray nozzle 25. Spray nozzle 25 comprises a circumferentially-complete tubular member of generally rectangular shape having a central opening somewhat larger than the discharge opening of conduit 23. The spray ring is spaced a relatively short distance below the discharge level of conduit 23, so that the discharging gaseous material readily passes through the rectangular opening in the spray ring. The spray ring 25 is supported upon a plurality of brackets 26 attached to and extending radially inward from the inner wall of vessel 19. The underside of the spray nozzle ring 25 is provided with a series of small openings through which the pre-quench oil may be sprayed downwardly into the downwardly moving stream of gaseous material.

The open lower end of vessel 19 is spaced a substantial distance from the bottom of tower 11, so that the pre-quench oil may be collected at the bottom of the tower and subsequently removed therefrom through quench oil outlet 27, while the accompanying gaseous material reverses its direction of flow around the lower perimeter of vessel 19 and flows upwardly through the annular passageway 28 formed between the cylindrical members 12 and 19. Directly above the suspended vessel 19, the upwardly-flowing gaseous material turns radially inward towards the axis of the vessel and passes upwardly through cylindrical conduit 16 into the main quench section of the tower 11.

The main quench section of the tower is of more or less conventional design, comprising an alternate series of vertically-spaced circular trays 29 and annular trays 31, all arranged concentrically within the tower in overhanging relationship, so that quench oil introduced at the top of the tower through inlet conduit 32 and deposited upon the uppermost tray cascades downwardly from tray to tray through the main quench section of the tower. Thus, the quench liquid descends as a successive plurality of annular curtains of free-falling liquid. The gaseous material discharging upwardly from conduit 16 at the bottom of the main quench section must therefore flow countercurrently to the quench oil, passing upwardly through the vessel in a zig-zag path and successively piercing each of the falling liquid curtains.

At the upper end of the tower 11, the gaseous reactor effluent, which has first been pre-cooled in the pre-quench section and then further cooled in the main quench section, is discharged through overhead outlet 33.

Figure 5:
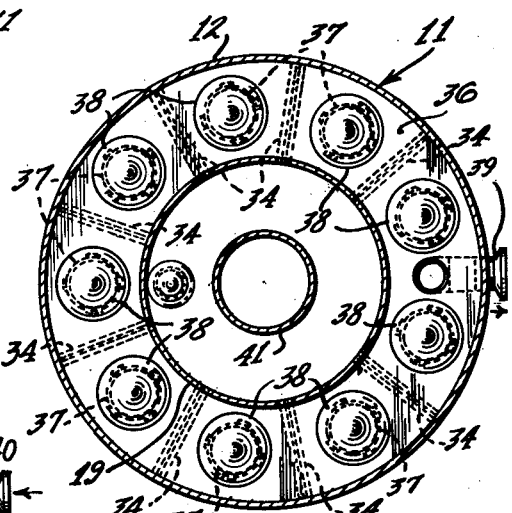
FIG. 5 is a horizontal section taken along line 5—5 of FIG. 4.

Referring to the modification of the pre-quench section shown in FIGS. 4 and 5, the cylindrical vessel 19 is supported at its lower end by a plurality of brackets 34 extending radially inward from the sides of tower section 12. The upper end of inner cylindrical vessel 19 is closed by a horizontal circular tray 35 which overhangs the sides of vessel.

The annular space or passageway 28 between the sides of cylindrical members 12 and 19 is sealed at its lower end by a horizontal annular plate 36, also supported by the brackets 34. A plurality of vertical tubes 37 have their lower ends set in openings provided in the annular plate 36 and extend upwardly within the annular space 28 to provide gas passages for the pre-quenched gaseous material flowing upwardly from the bottom region of the vessel 11. Each of the tubes 37 is provided with a conical hood 38 rigidly supported above the upper end of the tube to prevent the admission into the tube of quench liquid descending into the annular space 28. The portion of annular space 28 surrounding the tubes 37 forms a well which is provided with a quench oil outlet 39. The oil may then be used for pre-quench through nozzle 40.

The gaseous reactor effluent is introduced into the pre-quench vessel 19 through a vertical conduit 41 extending axially upward through the bottom of the tower 11 and terminating within the top region of the pre-quench vessel. The gaseous material discharges upwardly into the vessel 19 and, reversing its direction of flow, passes downwardly through the annular space or passageway 42 formed between the conduit 41 and the side walls of the cylindrical vessel 19. The pre-quench oil ring nozzle 25 is located at the upper end of the annular space 42 and surrounds the upper end of gas inlet conduit 41. Oil sprayed downwardly through openings distributed along the bottom of the ring nozzle accompanies the gaseous material passing downwardly through annular passageway 42, and is subsequently collected at the bottom of the lower tower section 12. The quench oil is drained from the bottom of the tower through outlet 27 which, because of the central location of conduit 41, is moved to one side thereof.

In this modification of the invention, the plurality of tray levels of the main quench tower may be continued downwardly well within the annular space 28 formed between the main tower walls and internal cylindrical member 19. Thus, in addition to the series of trays 29 and 31, illustrated in FIG. 1, and the tray 35 which serves as the cover for the cylindrical member 19, there are two annular trays 43 and 45 located within the annular space 28 between the level of tray 35 and the upper ends of the covered tubes 37. The uppermost tray 43 of these two additional trays is supported by suitable brackets 44 attached to the inner wall of tower section 12, while the lower tray 45 is supported by brackets 46 attached to the outer wall surface of cylindrical member 19. Since the lower annular tray 45 has its outer edge centered within the annular passageway 28, a portion of the quench oil overflowing from the tray falls onto and is deflected by the conical hoods 38 supported above the standpipes 37.

The modification of the invention shown in FIGS. 6 and 7 is similar to that of FIGS. 4 and 5, with the exception that a single cylindrical member 47 takes the place of vertical tubes 37. Cylindrical member 47 is concentrically spaced from the outer surface of cylinder 19 to provide an annular passageway 48 of sufficient size to convey the gaseous material from the bottom region of the tower section 12 into the region of annular passageway 28 beneath the annular tray 45. The lower edge of cylindrical member 47 is supported by the brackets 34, and the annular space 49 formed between the member 47 and the inner wall of tower section 12 is closed at its lower end by a horizontal annular plate 51. Thus, annular space 49 provides a well to receive the cascading quench oil, which is then drained to the exterior of the tower 11 through quench oil outlet 39.

Obviously many modifications and variations of the invention as hereinbefore set forth may be made without departing from the spirit and scope thereof, and therefore

What is claimed is:

A quench tower for effecting a two-stage cooling of the gaseous effluent from a hydrocarbon conversion reactor comprising: an upright elongated cylindrical vessel having a quench oil inlet and an outlet for cooled gaseous effluent at its upper end and a pre-quench oil outlet at its lower end; a smaller cylindrical vessel concentrically positioned in the lower region of the larger vessel and spaced inwardly from the side walls thereof, said smaller vessel being closed at its upper end and having its open lower end spaced from the lower end of said larger vessel; an annular plate positioned horizontally at the lower end of the annular space formed between the side walls of said vessels and dividing said larger vessel into separate upper and lower chambers; a plurality of vertical tubes having their lower ends set in openings distributed uniformly around said annular plate to provide open communication for flow of gaseous effluent between said chambers; a quench oil drain at the bottom of said annular space communicating with the exterior of said larger vessel; an inlet conduit for said gaseous effluent extending axially upward through the bottom of said larger vessel and into said smaller vessel, terminating within and near the upper end of said smaller vessel; a pre-quench oil inlet conduit extending through the walls of said vessels and terminating in a horizontal ring nozzle concentrically encircling the upper end portion of said inlet conduit for gaseous effluent, said ring nozzle having openings along its under side adapted to spray pre-quench oil downwardly through the annular passageway formed between said effluent inlet conduit and said smaller vessel; means for causing said quench oil introduced at the top of said larger vessel to cascade downwardly through said upper chamber, including said annular space, in intimate countercurrent contact with gaseous effluent flowing upwardly from said vertical tubes to said outlet for cooled gaseous effluent at the top of said larger vessel; and hoods supported above the tops of said vertical tubes for deflecting cascading quench oil away from the open ends thereof.

References Cited in the file of this patent

UNITED STATES PATENTS

| | | |
|---|---|---|
| 1,606,032 | Kolstrand | Nov. 9, 1926 |
| 1,684,489 | Halloran | Sept. 18, 1928 |
| 2,259,034 | Fisher | Oct. 14, 1941 |
| 2,817,411 | Coberly | Dec. 24, 1957 |